(12) United States Patent
Kapoor et al.

(10) Patent No.: US 8,032,076 B2
(45) Date of Patent: Oct. 4, 2011

(54) CELLULAR TELEPHONE AND MULTIMEDIA ACCESSORY AUDIO SYSTEM ADAPTOR AND METHODS THEREFOR

(75) Inventors: Vikram Kapoor, Chicago, IL (US); Chuck Nicketta, Palatine, IL (US); Dave Hess, McHenry, IL (US); Mike Aulert, Fox River Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 3022 days.

(21) Appl. No.: 09/933,321

(22) Filed: Aug. 20, 2001

(65) Prior Publication Data
US 2003/0036407 A1 Feb. 20, 2003

(51) Int. Cl.
*H04H 20/71* (2008.01)

(52) U.S. Cl. ........ 455/3.06; 455/66.1; 455/68; 455/344; 455/347; 455/556.1; 360/62; 369/2; 369/47.26; 379/68

(58) Field of Classification Search .................. 455/557, 455/569.1, 569.2, 570, 414.1, 556.1, 344, 455/345, 41.1, 149, 68, 3.06, 66.1, 347, 550.1, 455/575.1, 575.9, 899; 360/55, 62; 369/1, 369/2, 4, 6, 47.26; 379/68, 69, 70
See application file for complete search history.

(56) References Cited

U.S. PATENT DOCUMENTS

| | | | |
|---|---|---|---|
| 4,517,410 A * | 5/1985 | Williams et al. ................. | 379/73 |
| 4,734,897 A | 3/1988 | Schotz | |
| 5,001,585 A * | 3/1991 | Schalk ........................ | 360/281.5 |
| 5,333,177 A | 7/1994 | Braitberg et al. | |
| 5,479,479 A | 12/1995 | Braitberg et al. | |
| 5,535,274 A | 7/1996 | Braitberg et al. | |
| 5,781,850 A | 7/1998 | Ugge et al. | |
| 5,790,423 A * | 8/1998 | Lau et al. ......................... | 700/94 |
| 5,797,088 A | 8/1998 | Stamegna | |
| 5,978,689 A * | 11/1999 | Tuoriniemi et al. ........ | 455/569.1 |
| 6,058,319 A * | 5/2000 | Sadler ......................... | 455/569.2 |
| 6,085,078 A | 7/2000 | Stamegna | |
| 6,085,298 A | 7/2000 | Ohran | |
| 6,091,672 A | 7/2000 | Oh | |
| 6,163,711 A * | 12/2000 | Juntunen et al. ............... | 455/557 |
| 6,301,513 B1 * | 10/2001 | Divon et al. ..................... | 700/94 |
| 6,941,180 B1 * | 9/2005 | Fischer et al. ................... | 700/94 |
| 2002/0086716 A1 * | 7/2002 | Pan ................. | 455/569 |
| 2002/0142803 A1 * | 10/2002 | Yamamoto ..................... | 455/557 |
| 2003/0036414 A1 * | 2/2003 | Huang ........................... | 455/569 |
| 2004/0204042 A1 * | 10/2004 | Neaves et al. .............. | 455/556.1 |

FOREIGN PATENT DOCUMENTS

EP 001096420 A2 * 2/2001

OTHER PUBLICATIONS

COBY CA-M800 Cellular Phone Car Adapter, Usage and Instructions for Use (2 pages).
ROME Products—ROME MP3 Player UP-322 and ROME MP3 Player UP-301, Product detail (2 pages).

* cited by examiner

*Primary Examiner* — Shaima Q Aminzay
(74) *Attorney, Agent, or Firm* — Roland K. Bowler, II

(57) ABSTRACT

An audiocassette adapter (10) for coupling a mobile wireless communication station (20) to an audiocassette player, including a cassette head coupling device (12), a cassette adapter insertion detect switch (14), a mobile wireless communication station coupling device (50) having a mobile wireless communication station audio input coupled to the cassette head coupling device, the mobile wireless communication station coupling device having an insertion detect signal output (54) coupled to the cassette adapter insertion detect switch.

20 Claims, 4 Drawing Sheets

CELLULAR TELEPHONE AND MULTIMEDIA ACCESSORY AUDIO SYSTEM ADAPTOR AND METHODS THEREFOR

FIELD OF THE DISCLOSURE

The present disclosure relates generally to audio system adapters for mobile electronic devices, and more particularly to audio cassette player adapters for cellular telephones and multimedia players, combinations thereof and methods.

BACKGROUND

Audiocassette adapters for coupling audio outputs of cellular telephones and MP3 players to audio systems via audiocassette players are known generally.

U.S. Pat. No. 5,781,850 entitled "Live Voice Device For Cellular Phones Particularly Operable In Combination With Radio Receiver Apparatus in Motor Vehicles", for example, discloses a dummy cassette adapter having an audio input coupled, via an amplifier circuit, to a magnetic transducer in the adapter that communicates audio signals from the cellular telephone to a cassette tape player head in a vehicle audio system. The cassette adapter includes a remote microphone for use with the cellular telephone. See also, U.S. Pat. No. 6,091,672 entitled "Adapter For Coupling Audio Signals To Front-Loading Or Side-Loading Cassette Playback Decks, And Method For Using Same", and U.S. Pat. No. 4,734,897 entitled "Cassette Adapter For Playback Device, Such As A Compact Disk Player".

The various aspects, features and advantages of the present disclosure will become more fully apparent to those having ordinary skill in the art upon careful consideration of the following Detailed Description with the accompanying drawings described below.

DETAILED DESCRIPTION

Figure 1:
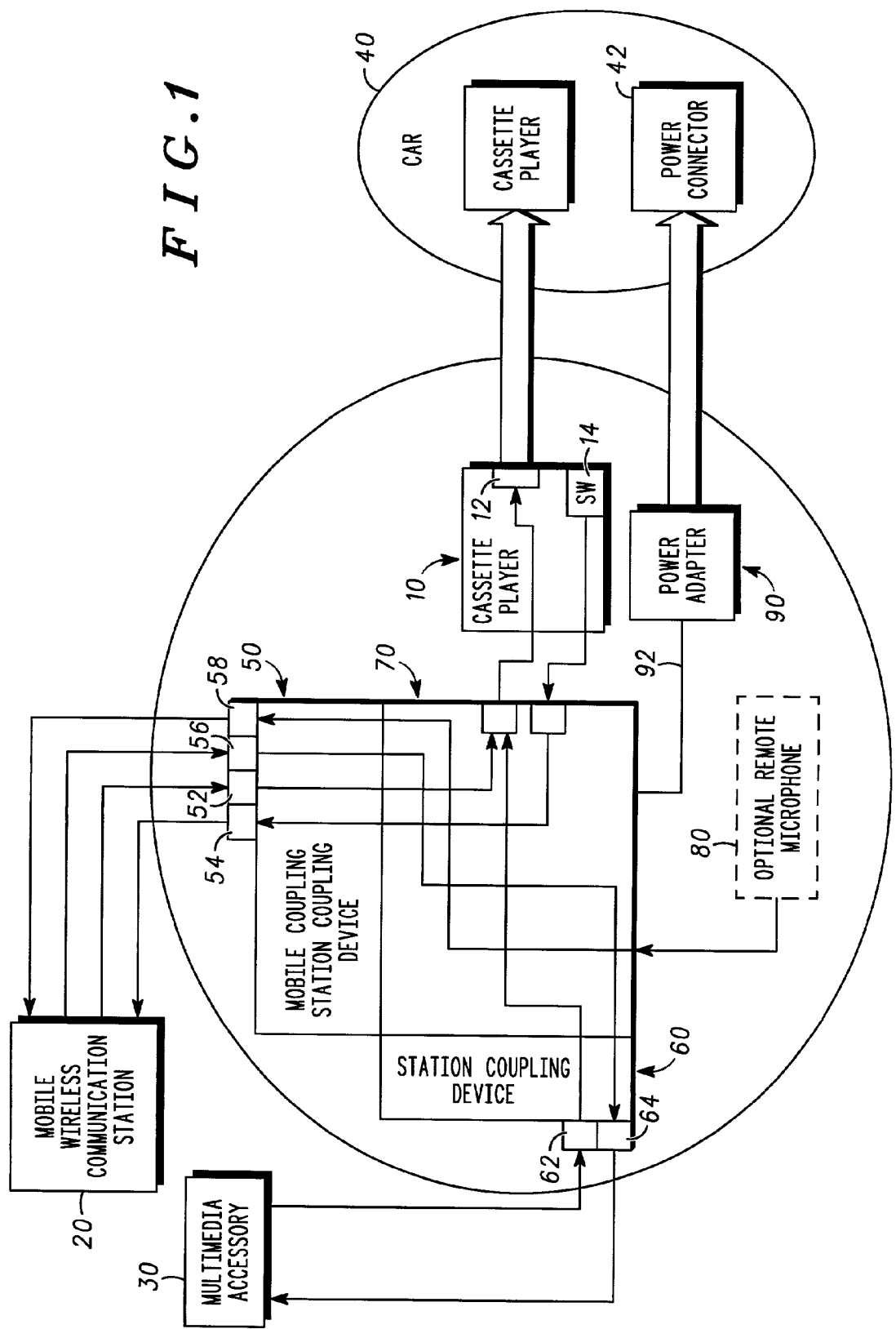
FIG. 1 is a schematic of an exemplary audiocassette adapter.

In FIG. 1, an audiocassette adapter 10 comprises a cassette head coupling device 12, for example, a stereo audio transducer, for coupling to a cassette player head, or cassette head, of an audiocassette player as is well known in the art.

The cassette head coupling device is coupled generally to a portable electronic device, and more particularly to an audio output thereof, to provide audio signals to the audiocassette player.

In FIG. 1, the audiocassette adapter 10 interconnects a mobile wireless communication station 20 and a multimedia accessory 30 to an automotive audiocassette player 40. More particularly, in FIG. 1, the cassette adapter 10 includes a mobile wireless communication station coupling device 50 having a mobile wireless communication station audio input 52 coupled to the cassette head coupling device 12. The exemplary cassette adapter also includes a portable multimedia accessory, for example, an MP3 player, coupling device 60 having a multimedia audio input 62 coupled to the cassette head coupling device 12. Other audio devices may also be coupled to the cassette head coupling device.

The mobile wireless communication station coupling device 50 and the multimedia accessory coupling device 60 may be in the form of standard or proprietary electrical connectors coupled to the cassette adapter 10 by an electrical cable. Alternatively audio inputs 52 and 62 may be disposed directly on the cassette adapter 10.

In some embodiments, the cassette adapter 10 includes a cassette adapter insertion detect switch 14 for indicating when the cassette head coupling device is operably coupled to a cassette head of the audiocassette player. The cassette adapter insertion detect switch 14 is, for example, a switch disposed in the cassette adapter, wherein the switch is opened or closed when player cassette head is engaged with the cassette head coupling device 12. An exemplary switch is discussed more fully below.

The mobile wireless communication station coupling device 50 includes an insertion detect signal output 54 coupled to the cassette adapter insertion detect switch 14. Thus configured, the mobile wireless communication device can detect when it is coupled to a cassette adapter operably coupled to a cassette player head.

In some embodiments of the invention, the multimedia accessory coupling device 60 includes a multimedia mute output 64 coupled to a multimedia mute input 56 on the mobile wireless communication station coupling device 50. Thus configured, the communication device 20 can send a mute signal to the multimedia device 30 for muting audio from the device 30, for example, an MP3 player, when a communication is received or initiated by the communication device 20. In one application, when the communication is complete, the audio from the multimedia accessory to the cassette adapter resumes, for example the communications device 20 removes the mute signal or otherwise sends an enabling signal to the multimedia accessory.

In one embodiment, the mobile wireless communication station coupling device 50 and the multimedia accessory coupling device 60 are coupled to or mounted on a common housing 70 having a bundled cable providing electrical connections to the cassette adapter 10. The bundled electrical connections may include, for example, audio signal cables from the audio inputs 52 and 62 and an insertion detect signal cable from the switch 14 on the cassette adapter 10 to the insertion detect output 54, among others.

In some embodiments, a remote microphone 80 is connectable to communications device 20, for example, via a microphone jack, not illustrated but well known in the art, on the housing 70. In one embodiment, the microphone jack is coupled to an output 58 of the mobile wireless communication station coupling device 50.

In another embodiment, a power adapter 90, for example a 12 volt automotive adaptor, provides electrical power to the communications device 20 and the multimedia accessory 30 with a cable 92 coupled to corresponding outputs, not illustrated, of the mobile wireless communication station coupling device 50 and the multimedia accessory coupling device 60. The exemplary power adapter is connectable to a power connector 42 common in automobiles.

Figure 2:
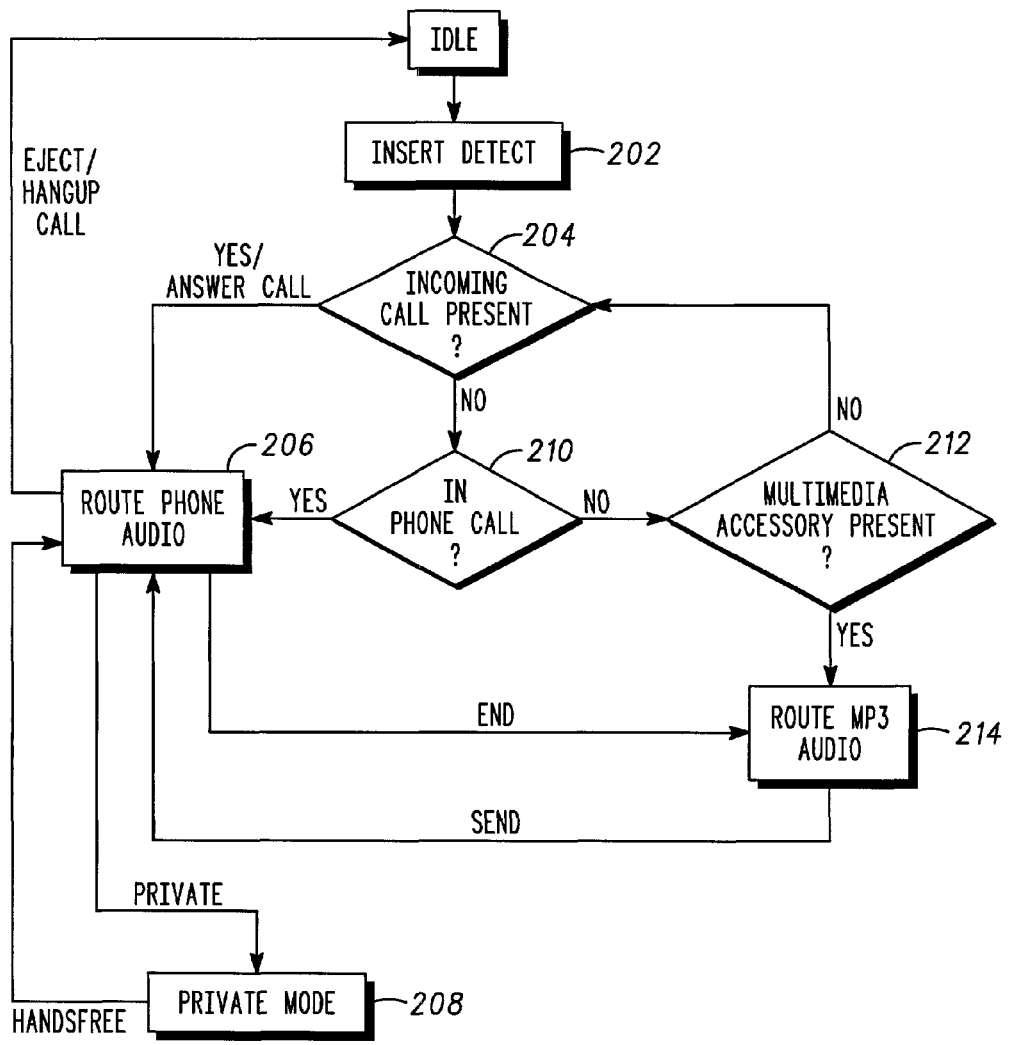
FIG. 2 is an exemplary audiocassette adapter operating flow diagram.

FIG. 2 is an exemplary process flow diagram illustrating the operation of a communication station, like a cellular telephone, and a multimedia accessory with a cassette adapter having features of the present invention. Upon detecting that the cassette adapter is operably coupled to an audiocassette player at block 202, audio from the communications device is provided to the cassette adapter and thus to the audiocassette player, which drives audio system loudspeakers.

In one embodiment, at block 204, if an incoming call is present and insertion is detected at block 202, audio from the communication device is automatically routed to the cassette adapter at block 206. In some embodiments, a mute signal is generated by the communication device and transmitted to any multimedia accessory that may be coupled to the cassette adapter. In one embodiment, audio from the communication device is transmitted to the multimedia accessory, whereupon the multimedia accessory is muted. In other embodiments, the communication device may generate a mute signal recognized by the accessory.

In another embodiment, at block 208, the routing of audio from the communication device to the cassette adapter is disabled/enabled, for example by a user actuated soft switch on the communication device, thereby enabling the user to communicate privately, without broadcasting the audio communications over the audio system via the cassette adapter.

During a call as determined at block 210, audio from the communication device is routed to the cassette adapter at block 206. At block 206, upon ending a call, for example by depressing the "End" key on the communication device, any audio from a multimedia accessory is routed to the cassette adapter. Also, upon initiating a call, for example, by depressing the "Send" key, any audio from the multimedia accessory is disabled, for example by sending the mute signal to the accessory, and audio from the phone is routed to the cassette adapter.

At block 212, if a multimedia device is present, in the absence of a call, audio from the multimedia device is routed to the cassette adapter at block 214.

In another embodiment, the cassette adapter includes an audiocassette player command control signal output, which can be transmitted to a portable electronic device, for example an MP3 player or a cellular phone, for the control of the device with the audiocassette player controls. In one embodiment, an audiocassette player command signal generator is coupled to the control signal output for generating and outputting unique control signals corresponding to audiocassette player commands, for example play, forward, rewind and stop commands executed or controlled by a user, for example from an automobile dashboard.

Figure 3:
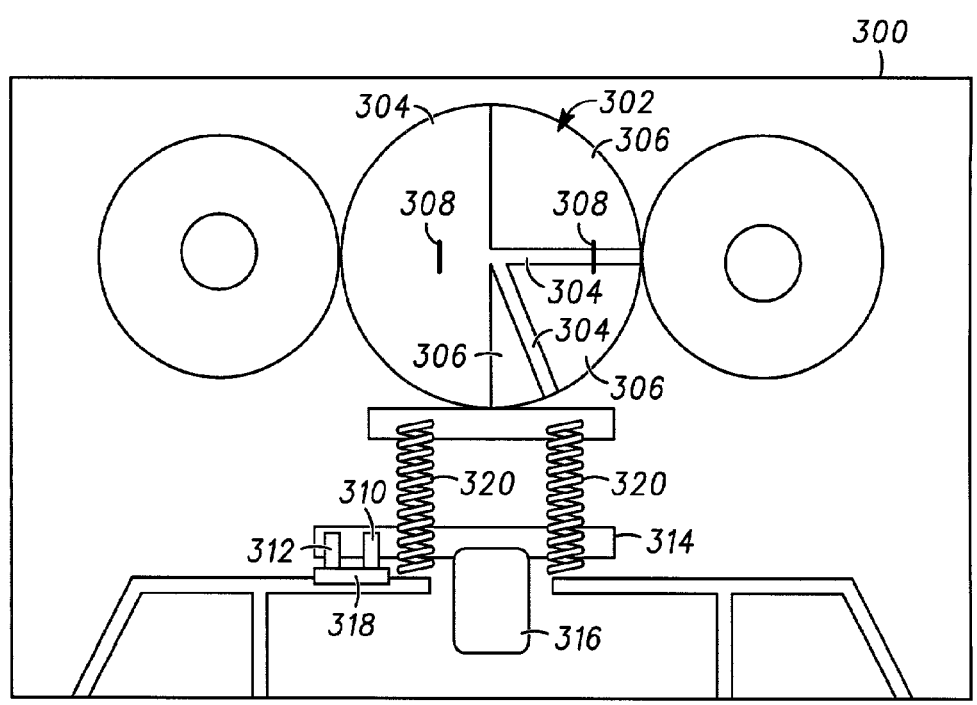
FIG. 3 is a schematic diagram of an exemplary audiocassette adapter.

In one embodiment, the audiocassette player command signal generator comprises a rotational transducer with a transducer output coupled to the control signal output of the audiocassette adapter. In FIG. 3, for example, the cassette adapter 300 comprises a rotatable spur gear 302 having conductive portions 304 separated by nonconductive portions 306. First and second slide contacts 308 mounted on some portion of the cassette adapter 300 are biased into contact with the rotatable spur gear 302. As the gear 302 rotates, the conductive portions 304 thereof periodically electrically interconnect the contacts 308 depending on the rotational position of the gear.

The conductive portions 304 are arranged so that unique output signals are generated for the various modes of operation of the cassette player to which the cassette adapter is coupled. The exemplary embodiment spur gear provides unique signals for forward, reverse, fast forward and fast reverse. Other arrangements of the conductive and non-conductive portions 304 and 306 of the spur gear will also provide unique signals suitable for the purposes of the present invention.

In one embodiment, the audiocassette player command signal generator of the cassette adapter also comprises a cassette head actuatable switch with a switch output coupled to the control signal output of the audiocassette adapter. Such a switch detects the whether the play or stop command has been actuated by detecting whether the player head is engaged with the cassette head coupling device or adapter.

In FIG. 3, for example, the cassette adapter 300 comprises a momentary switch including first and second contacts, engaged upon actuation of a spring biased cassette head actuatable member. Two contacts 310 and 312 are mounted in spaced apart relation on a movable mounting member 314 on which a cassette head coupling device 316 is mounted. Another contact 318 is mounted fixedly on a portion of the cassette adapter. One or more springs 320 bias the contacts 310 and 312 of the mounting member 314 into engagement with the contact 318 when the head coupling device 316 is not operably engaged with a cassette player head, thus closing a circuit formed by contacts 310 and 312. The mounting member 314 is movable against the bias of the springs 320 upon engagement of the coupling device 316 with a cassette player head thus moving the contacts away from the contact 318 and forming an open circuit.

Alternatively, the contact 318 may be mounted on the member 314 and the contacts 310 and 312 may be mounted on the stationary portion. Other switch configurations may also be used for detecting when the play and stop commands are actuated, for example a single contact may be disposed on the movable member, or a different switch may be used, for example a micro-switch may be mounted on the movable mounting member 314 and actuated upon contacting some fixed portion of the cassette adapter.

Figure 4:
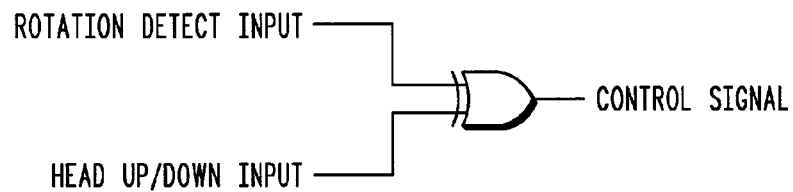
FIG. 4 is a schematic electrical diagram.

The outputs of the switch and transducer may also be combined logically to provide unique outputs. In FIG. 4, for example, outputs from the rotational transducer and from the head actuation switch are combined in an XOR logic gate to produce a single control signal output.

Figure 5:
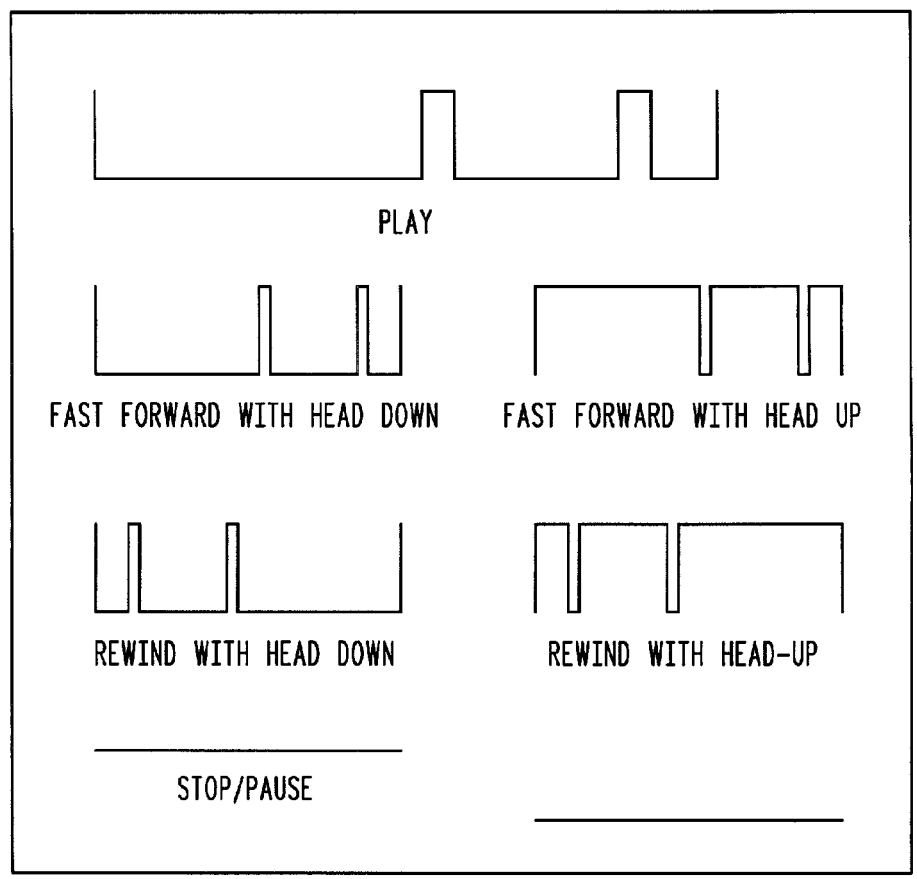
FIG. 5 illustrates several exemplary control signal waveforms.

FIG. 5 illustrates an exemplary set of unique control signals corresponding to common audiocassette commands, PLAY, FF (Head down) FF (Head up), REWIND (Head up), REWIND (Head down), and STOP/PAUSE, generated by the exemplary rotational transducer and cassette head actuatable switch. These unique signals may be used to control functions of a portable electronic device. A user may thus control a cellular phone or multimedia device with readily accessible audiocassette command controls, for example those on an automobile dashboard.

While the present disclosure and what is considered presently to be the best modes thereof have been described in a manner that establishes possession thereof by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. An audiocassette adapter for coupling a mobile wireless communication station to an audiocassette player, comprising:
   a cassette head coupling device;
   a cassette adapter insertion detect switch;
   a mobile wireless communication station coupling device having a mobile wireless communication station audio input coupled to the cassette head coupling device,
   the mobile wireless communication station coupling device having an insertion detect signal output coupled to the cassette adapter insertion detect switch.

2. The audiocassette adapter of claim 1, the audiocassette adapter having a multimedia accessory coupling device having a multimedia input coupled to the cassette head coupling device.

3. The audiocassette adapter of claim 2, the multimedia accessory coupling device having a multimedia mute output coupled to a multimedia mute input on the mobile wireless communication station coupling device.

4. The audiocassette adapter of claim 1, the cassette adapter insertion detect switch having a state for indicating that the cassette head coupling device is operably coupled to a head of the audiocassette player.

5. The audiocassette adapter of claim 1, an audiocassette player command control signal output on the cassette adapter.

6. The audiocassette adapter of claim 1, a control signal output on the cassette adapter coupled to an audiocassette player command signal generator for outputting control signals in response to audiocassette player commands.

7. The audiocassette adapter of claim 6, the audiocassette player commands include play, forward, rewind, stop and pause.

8. An audiocassette adapter for coupling a mobile electronic device to an audiocassette player, comprising:
   a cassette head coupling device;
   a mobile electronic device input coupled to the cassette head coupling device;
   an audiocassette player command signal generator;
   a control signal output coupled to the audiocassette player command signal generator.

9. The audiocassette adapter of claim 8, the audiocassette player command signal generator for outputting unique control signals in response to corresponding audiocassette player commands.

10. The audiocassette adapter of claim 8, the audiocassette player command signal generator comprising a rotational transducer with a transducer output coupled to the control signal output of the audiocassette adapter.

11. The audiocassette adapter of claim 10, the audiocassette player command signal generator comprising a rotatable spur gear having a conductive portions separated by nonconductive portions, first and second slide contacts contacting the rotatable spur gear.

12. The audiocassette adapter of claim 8, the audiocassette player command signal generator comprising a cassette head actuatable switch with a switch output coupled to the control signal output of the audiocassette adapter.

13. The audiocassette adapter of claim 8, the audiocassette player command signal generator comprising a momentary switch including first and second contacts, one of the first and second contacts disposed on a spring biased cassette head actuatable member.

14. The audiocassette adapter of claim 8,
   the audiocassette player command signal generator comprising a cassette head actuatable switch, the audiocassette player command signal generator comprising a rotational transducer;
   a logic device having an output coupled to the control signal output;
   a switch output of the cassette head actuatable switch coupled to an input of the logic device, a transducer output of the rotational transducer coupled to another input of the logic device.

15. The audiocassette adapter of claim 14, the audiocassette player command signal generator for outputting unique control signals in response to corresponding audiocassette player commands.

16. A method for coupling a mobile wireless communications station to an audio system with a cassette adapter disposable in a cassette player, comprising:
   detecting when the cassette adapter is disposed operably in the cassette player;
   providing a cassette adapter insertion detect signal to a mobile wireless communication station coupling device output on the cassette adapter when the cassette adapter is disposed operably in the cassette player.

17. The method of claim 16, providing a multimedia device mute signal to a multimedia output of the cassette adapter.

18. The method of claim 16, providing the multimedia device mute signal to a multimedia output of the cassette adapter when receiving an audio signal at an audio at a mobile wireless communication station audio input of the cassette adapter.

19. The method of claim 16, providing a control signal at a control signal output of the cassette adapter in response to an audiocassette player command.

20. The method of claim 16, providing control signals at a control signal output of the cassette adapter by generating unique control signals with one of a rotational transducer of the cassette adapter and a momentary switch of the cassette adapter in response to audiocassette player play, forward, rewind, stop and pause commands.

* * * * *